(12) United States Patent
Feliberti et al.

(10) Patent No.: US 10,176,462 B2
(45) Date of Patent: *Jan. 8, 2019

(54) CALENDAR REPAIR ASSISTANT

(71) Applicant: Microsoft Technology Licensing, LLC, Redmond, WA (US)

(72) Inventors: Vanessa C. Feliberti, Sammamish, WA (US); Cliff M. Don, Redmond, WA (US); Firdosh R. Ghyara, Redmond, WA (US); Sina Hakami, Kirkland, WA (US); Matthias Leibmann, Woodinville, WA (US); Roberto Ribeiro Da Fonseca Mendes, Seattle, WA (US); Paul David Tischhauser, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/948,973

(22) Filed: Nov. 23, 2015

(65) Prior Publication Data

US 2016/0078412 A1 Mar. 17, 2016

Related U.S. Application Data

(63) Continuation of application No. 13/765,644, filed on Feb. 12, 2013, now Pat. No. 9,213,964, which is a continuation of application No. 12/647,934, filed on Dec. 28, 2009, now Pat. No. 8,375,081.

(51) Int. Cl.
*G06F 15/16* (2006.01)
*G06Q 10/10* (2012.01)
*G06F 17/30* (2006.01)

(52) U.S. Cl.
CPC ....... *G06Q 10/1095* (2013.01); *G06Q 10/109* (2013.01); *G06F 17/30286* (2013.01); *G06F 17/30345* (2013.01); *G06F 17/30575* (2013.01); *G06F 17/30581* (2013.01); *G06Q 10/10* (2013.01); *G06Q 10/1093* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,093,901 A | * | 3/1992 | Cree | G06Q 10/109 715/753 |
| 5,774,867 A | | 6/1998 | Fitzpatrick et al. | |
| 5,960,406 A | * | 9/1999 | Rasansky | G06Q 10/1093 705/7.18 |
| 6,064,977 A | * | 5/2000 | Haverstock | G06F 17/30893 705/7.18 |

(Continued)

OTHER PUBLICATIONS

"*Introducing BusyCal*"; accessed on Oct. 28, 2009 at http://www.busymac.com/; 2 pgs.

(Continued)

*Primary Examiner* — Alan S Chou (57) ABSTRACT

Calendar repair may be provided. Calendar events, such as appointments and meetings, may be created and copied to a plurality of attendee calendars. A first copy of the event may be compared to a second copy of the event, and an event property of the second event may be updated to match a corresponding event property of the first event.

19 Claims, 5 Drawing Sheets

(56) References Cited

U.S. PATENT DOCUMENTS

| | | | |
|---|---|---|---|
| 6,295,541 B1* | 9/2001 | Bodnar | G06F 17/30353 |
| 6,369,840 B1* | 4/2002 | Barnett | G06Q 10/06314 |
| | | | 715/751 |
| 6,480,830 B1* | 11/2002 | Ford | G06Q 10/109 |
| | | | 705/7.19 |
| 6,604,079 B1* | 8/2003 | Ruvolo | G06Q 10/06311 |
| | | | 705/7.15 |
| 6,640,230 B1* | 10/2003 | Alexander | G06Q 10/107 |
| 6,781,920 B2 | 8/2004 | Bates et al. | |
| 6,988,128 B1* | 1/2006 | Alexander | G06Q 10/109 |
| | | | 709/206 |
| 7,039,596 B1* | 5/2006 | Lu | G06Q 10/06311 |
| | | | 705/7.13 |
| 7,174,517 B2* | 2/2007 | Barnett | G06Q 10/06314 |
| | | | 715/751 |
| 7,318,040 B2* | 1/2008 | Doss | G06Q 10/06311 |
| | | | 705/7.16 |
| 7,334,000 B2* | 2/2008 | Chhatrapati | G06F 17/30471 |
| 7,370,282 B2 | 5/2008 | Cary | |
| 7,383,291 B2* | 6/2008 | Guiheneuf | G06Q 10/06311 |
| | | | 705/7.13 |
| 7,383,308 B1* | 6/2008 | Groves | G06Q 10/109 |
| | | | 709/205 |
| 7,487,234 B2* | 2/2009 | Doss | G06Q 10/109 |
| | | | 370/412 |
| 7,584,114 B2* | 9/2009 | Estrada | G06Q 10/06311 |
| | | | 705/7.17 |
| 7,584,412 B1* | 9/2009 | Raff | G06Q 10/109 |
| | | | 707/999.01 |
| 7,599,990 B1* | 10/2009 | Groves | G06Q 10/109 |
| | | | 709/204 |
| 7,644,125 B2 | 1/2010 | Baynes et al. | |
| 7,668,775 B2* | 2/2010 | Lu | G06Q 10/06311 |
| | | | 705/37 |
| 7,689,698 B2* | 3/2010 | Hullot | G06F 17/30578 |
| | | | 370/342 |
| 7,792,790 B2 | 9/2010 | Kim | |
| 7,814,055 B2* | 10/2010 | Hullot | G06F 17/30578 |
| | | | 707/620 |
| 7,822,713 B2* | 10/2010 | Hullot | G06Q 10/109 |
| | | | 707/620 |
| 7,827,240 B1* | 11/2010 | Atkins | G06Q 10/109 |
| | | | 709/200 |
| 7,840,543 B2* | 11/2010 | Guiheneuf | G06Q 10/06311 |
| | | | 707/638 |
| 7,870,215 B1* | 1/2011 | Groves | G06Q 10/109 |
| | | | 709/205 |
| 7,873,646 B2* | 1/2011 | Yach | G06F 9/542 |
| | | | 455/412.2 |
| 7,917,127 B2* | 3/2011 | Mousseau | H04M 1/6505 |
| | | | 379/201.1 |
| 7,991,636 B1* | 8/2011 | Groves | G06Q 10/109 |
| | | | 705/7.18 |
| 7,991,637 B1* | 8/2011 | Guiheneuf | G06Q 10/109 |
| | | | 705/7.18 |
| 8,019,863 B2 | 9/2011 | Jeide et al. | |
| 8,041,594 B2* | 10/2011 | Wilbrink | G06Q 10/06312 |
| | | | 705/7.18 |
| 8,041,725 B2* | 10/2011 | Grant | G06Q 10/109 |
| | | | 707/754 |
| 8,074,175 B2* | 12/2011 | Brush | G06Q 10/109 |
| | | | 715/751 |
| 8,108,436 B2* | 1/2012 | Chhatrapati | G06F 17/30471 |
| | | | 705/7.18 |
| 8,121,880 B2* | 2/2012 | O'Sullivan | G06Q 10/02 |
| | | | 705/7.18 |
| 8,209,613 B2* | 6/2012 | Zinn | G06Q 10/109 |
| | | | 715/733 |
| 8,352,303 B2* | 1/2013 | Lehmann | G06Q 10/06314 |
| | | | 705/14.53 |
| 8,359,540 B2* | 1/2013 | Darling | G06Q 10/109 |
| | | | 707/769 |
| 8,375,081 B2 | 2/2013 | Feliberti et al. | |
| 8,612,535 B2 | 2/2013 | Mendes et al. | |
| 8,392,365 B2 | 3/2013 | Feliberti et al. | |
| 8,417,782 B2* | 4/2013 | Tendjoukian | G06Q 10/109 |
| | | | 709/204 |
| 8,612,876 B2* | 12/2013 | Barnett | G06Q 10/06314 |
| | | | 715/767 |
| 8,671,009 B1* | 3/2014 | Coley | G06Q 10/109 |
| | | | 705/7.13 |
| 9,053,466 B2* | 6/2015 | Caceres | G06Q 10/109 |
| 9,213,964 B2 | 12/2015 | Feliberti et al. | |
| 9,552,571 B2* | 1/2017 | Jain | G06Q 10/109 |
| 2002/0154178 A1 | 10/2002 | Barnett | G06Q 10/06314 |
| | | | 715/853 |
| 2003/0050982 A1* | 3/2003 | Chang | G06F 17/30265 |
| | | | 709/206 |
| 2003/0131023 A1* | 7/2003 | Bassett | G06F 17/30575 |
| 2003/0154116 A1* | 8/2003 | Lofton | G06Q 10/1095 |
| | | | 705/7.19 |
| 2004/0064567 A1* | 4/2004 | Doss | G06Q 10/109 |
| | | | 709/228 |
| 2004/0073615 A1* | 4/2004 | Darling | G06Q 10/109 |
| | | | 709/206 |
| 2004/0203644 A1* | 10/2004 | Anders | H04M 3/06 |
| | | | 455/414.1 |
| 2004/0225966 A1* | 11/2004 | Besharat | G06Q 10/109 |
| | | | 715/705 |
| 2004/0243547 A1* | 12/2004 | Chhatrapati | G06F 17/30471 |
| 2005/0102317 A1 | 5/2005 | Kamarei | |
| 2005/0149726 A1 | 7/2005 | Joshi et al. | |
| 2005/0187896 A1* | 8/2005 | Mousseau | G06F 9/542 |
| 2005/0198085 A1 | 9/2005 | Blakey et al. | |
| 2005/0216842 A1 | 9/2005 | Keohane et al. | |
| 2005/0262164 A1* | 11/2005 | Guiheneuf | G06Q 10/109 |
| 2006/0007785 A1* | 1/2006 | Fernandez | G06Q 10/109 |
| | | | 368/10 |
| 2006/0190313 A1* | 8/2006 | Lu | G06Q 10/06311 |
| | | | 705/7.19 |
| 2006/0212330 A1 | 9/2006 | Savilampi | |
| 2007/0016646 A1* | 1/2007 | Tendjoukian | G06Q 10/109 |
| | | | 709/206 |
| 2007/0079260 A1 | 4/2007 | Bhogal et al. | |
| 2007/0129986 A1* | 6/2007 | Barnett | G06Q 10/06314 |
| | | | 715/767 |
| 2007/0162517 A1 | 7/2007 | Teegan et al. | |
| 2007/0168892 A1* | 7/2007 | Brush | G06Q 10/109 |
| | | | 715/751 |
| 2007/0260989 A1* | 11/2007 | Vakil | G06Q 10/109 |
| | | | 715/748 |
| 2008/0033957 A1* | 2/2008 | Forstall | G06Q 10/109 |
| 2008/0046437 A1 | 2/2008 | Wood | |
| 2008/0046471 A1 | 2/2008 | Moore et al. | |
| 2008/0120158 A1* | 5/2008 | Xiao | G06Q 10/06314 |
| | | | 705/7.18 |
| 2008/0134041 A1* | 6/2008 | Zinn | G06Q 10/109 |
| | | | 715/733 |
| 2008/0140488 A1 | 6/2008 | Oral et al. | |
| 2008/0189159 A1* | 8/2008 | Jain | G06Q 10/109 |
| | | | 705/7.18 |
| 2008/0191896 A1* | 8/2008 | Jain | G06Q 10/109 |
| | | | 340/4.32 |
| 2008/0195619 A1* | 8/2008 | Jain | G06Q 10/109 |
| 2008/0215691 A1* | 9/2008 | Chhatrapati | G06F 17/30471 |
| | | | 709/206 |
| 2008/0235681 A1 | 9/2008 | Barnett | |
| 2008/0243948 A1* | 10/2008 | Guiheneuf | G06Q 10/06311 |
| 2008/0250334 A1* | 10/2008 | Price | G06Q 10/109 |
| | | | 715/753 |
| 2008/0307323 A1* | 12/2008 | Coffman | G06Q 10/109 |
| | | | 715/753 |
| 2008/0313005 A1* | 12/2008 | Nessland | G06Q 10/06 |
| | | | 705/7.21 |
| 2009/0019050 A1 | 1/2009 | Baron et al. | |
| 2009/0040875 A1 | 2/2009 | Buzescu et al. | |
| 2009/0112986 A1* | 4/2009 | Caceres | G06Q 10/109 |
| | | | 709/204 |
| 2009/0150812 A1 | 6/2009 | Baker et al. | |

(56) References Cited

U.S. PATENT DOCUMENTS

| | | | |
|---|---|---|---|
| 2009/0152349 A1* | 6/2009 | Bonev | G06Q 30/00 235/383 |
| 2009/0157414 A1 | 6/2009 | O'Sullivan et al. | |
| 2009/0157693 A1* | 6/2009 | Palahnuk | G06Q 30/00 |
| 2009/0158173 A1* | 6/2009 | Palahnuk | G06Q 30/00 715/753 |
| 2009/0196123 A1 | 8/2009 | Gautam | |
| 2009/0201768 A1 | 8/2009 | Adams | |
| 2009/0248480 A1 | 10/2009 | Miksovsky | |
| 2009/0313299 A1* | 12/2009 | Bonev | G06Q 10/109 |
| 2010/0042733 A1* | 2/2010 | Jeffrey | H04M 1/72527 709/228 |
| 2010/0122190 A1* | 5/2010 | Lu | G06Q 10/06311 715/764 |
| 2010/0174679 A1 | 7/2010 | Baynes et al. | |
| 2010/0214875 A1* | 8/2010 | Wilson | G06Q 10/109 368/10 |
| 2010/0214876 A1 | 8/2010 | Siegel | |
| 2011/0093619 A1 | 4/2011 | Nelson | |
| 2011/0106278 A1 | 5/2011 | Martin-Cocher et al. | |
| 2011/0125545 A1* | 5/2011 | Lehmann | G06Q 10/06314 705/7.24 |
| 2011/0137929 A1 | 6/2011 | Lehmann et al. | |
| 2011/0153629 A1 | 6/2011 | Lehmann et al. | |
| 2011/0307816 A9* | 12/2011 | Barnett | G06Q 10/06314 715/767 |

OTHER PUBLICATIONS

Desruisseaux, B., et al.; "*Calendaring Extensions to WebDAV (CalDAV)*"The Internet Society; Feb. 21, 2006; 82 pgs.

Dusseault, L., et al.; "*Open Calendar Sharing and Scheduling with CalDAV*"; Standards Track, IEEE Internet Computing, IEEE Computer Society; Mar./Apr. 2005; pp. 81-89.

Microsoft TechNet; "*Understanding Calendar Repair*"; Sep. 9, 2009; accessed on Nov. 13, 2009 at http://technet.microsoft.com/en-us/library/dd298100(EXCHG.140).aspx; 2 pgs.

Microsoft TechNet; "*Understanding Calendar Repair*"; Microsoft Corporation; Sep. 9, 2009; accessed on Nov. 9, 2009 at http://technet.microsoft.comien-ushribraiy/dd298100.aspx; 2 pgs.

Notice of Allowance/Allowability in U.S. Appl. No. 12/647,934 dated Jun. 8, 2012, 15 pages.

Notice of Allowance/Allowability in U.S. Appl. No. 12/647,934 dated Oct. 22, 2012, 8 pages.

Notice of Allowance/Allowability in U.S. Appl. No. 12/647,962 dated Sep. 19, 2012, 18 pages.

Oracle; "*Oracle® Calendar Administrator's Guide*"; 10g Release 1 (10.1.1); Oct. 2005; 170 pgs.

Sun Microsystems; "*Sun Java™ System Calendar Server 6.3*" (White Paper); Apr. 2007; 40 pgs.

U.S. Non-Final Office Action dated Apr. 19, 2013 in U.S. Appl. No. 12/647,944, 18 pages.

U.S. Non-Final Office Action dated Nov. 27, 2013 in U.S. Appl. No. 13/765,644, 30 pages.

U.S. Notice of Allowance dated Aug. 14, 2013 in U.S. Appl. No. 12/647,944, 13 pages.

U.S. Official Action in U.S. Appl. No. 12/647,934 dated Jul. 16, 2012, 7 pages.

U.S. Official Action in U.S. Appl. No. 12/647,934 dated Dec. 27, 2011, 27 pages.

U.S. Official Action in U.S. Appl. No. 12/647,944 dated Jun. 12, 2012, 24 pages.

U.S. Official Action in U.S. Appl. No. 12/647,944 dated Dec. 22, 2011, 27 pages.

U.S. Official Action in U.S. Appl. No. 12/647,962 dated Mar. 6, 2012, 30 pages.

U.S. Appl. No. 13/765,644, Notice of Allowance dated Jan. 7, 2015, 6 pages.

U.S. Appl. No. 13/765,644, Notice of Allowance dated Apr. 23, 2015, 6 pages.

U.S. Appl. No. 13/765,644, Notice of Allowance dated Aug. 7, 2015, 6 pages.

U.S. Appl. No. 13/765,644, Office Action dated May 27, 2014, 11 pages.

U.S. Appl. No. 13/765,644, Office Action dated Aug. 20, 2014, 10 pages.

* cited by examiner

|  | Monday | Tuesday | Wednesday | Thursday | Friday |
|---|---|---|---|---|---|
| 8:00 | | | | | |
| 9:00 | | | | | |
| 10:00 | | Meeting 310 | | | |
| 11:00 | | | | | |
| 12:00 | | | Lunch 320 | AAA 330 | |
| 1:00 | | | | | |
| 2:00 | | | | | |
| 3:00 | | | | | |
| 4:00 | | | | | |
| 5:00 | | | | | |
| 6:00 | | | | | |

|  | Monday | Tuesday | Wednesday | Thursday | Friday |
|---|---|---|---|---|---|
| 8:00 | | | | | |
| 9:00 | | | | | |
| 10:00 | | | | | |
| 11:00 | | | | | |
| 12:00 | | Meeting 360 | | XYZ 370 | |
| 1:00 | | | | | |
| 2:00 | | | | | |
| 3:00 | | | | | |
| 4:00 | | | | | |
| 5:00 | | | | | |
| 6:00 | | | | | |

410 — Title: Meeting
420 — Re: Project Status

430 — Organizer: John Smith
440 — Attendees: Jane Doe, Bill Jones, John Doe

450 — Start Time: 9:30 AM
460 — Duration: 1.5 Hours

470 — Reminder: 15 Minutes

480 — Location: Conference Room 1

490 — Notes: Jane's deadline changed. Bill's last report needs revision.

CALENDAR REPAIR ASSISTANT

RELATED APPLICATIONS

This application is a continuation of, and claims priority to, U.S. Non-Provisional application Ser. No. 13/765,644, filed Feb. 12, 2013, now U.S. Pat. No. 9,213,964, which is a continuation of, and claims priority to U.S. Non-Provisional application Ser. No. 12/647,934, filed Dec. 28, 2009, now U.S. Pat. No. 8,375,081, each of which is hereby incorporated by reference in their entirety.

Related U.S. patent application Ser. No. 12/647,944, filed Dec. 28, 2009, now U.S. Pat. No. 8,612,535, entitled "Repairing Calendars with Standard Meeting Messages," which is assigned to the assignee of the present application, and incorporated by reference.

Related U.S. patent application Ser. No. 12/647,962, filed Dec. 28, 2009, now U.S. Pat. No. 8,392,365, entitled "Identifying Corrupted Data on Calendars with Client Intent," which is assigned to the assignee of the present application, and incorporated by reference.

BACKGROUND

Calendar repair is a process for verifying the accuracy of important meeting properties. In some situations, calendars contain appointments (meetings) that may be organized by one person, the Organizer. The same meeting may be represented as multiple independent items stored in many different calendars of all attendees of the meeting. The Organizer, attendees, and calendar applications may change these independent items during the lifetime of the meeting, making them inconsistent between what the Organizer has on the calendar and what attendees may have on their calendar. This often causes problems because, if the meeting gets out-of sync between the organizer and attendees, it may cause attendees to miss the meeting. The conventional strategy is to rely on attendee users to keep their own meeting appointments in-sync and up to date, but these users may not always be able to identify discrepancies.

SUMMARY

Calendar repair may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Calendar repair may be provided. Calendar events, such as appointments and meetings, may be created and copied to a plurality of attendee calendars. A first copy of the event may be compared to a second copy of the event, and an event property of the second event may be updated to match a corresponding event property of the first event.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Calendar repair may be provided. Consistent with embodiments of the present invention, corresponding calendar items of organizers and attendees may be compared on a regular basis. A calendar server, such as Microsoft® Exchange®, produced and sold by Microsoft® Corporation of Redmond, Wash., may verify that important properties such as time, date, and/or attendee response status match as inconsistencies in such properties may result in an attendee missing the meeting. The verification may be done by applying additional business logic to allow certain flexibility in discrepancies and allow attendees to still have enough flexibility to edit their meeting item. If the discrepancy violates the business logic (e.g., the inconsistency of the properties will lead to a missed meeting), the server may perform the appropriated corrective actions, such as changing properties on an attendee's appointment to match the organizer's version of the appointment.

Figure 1:
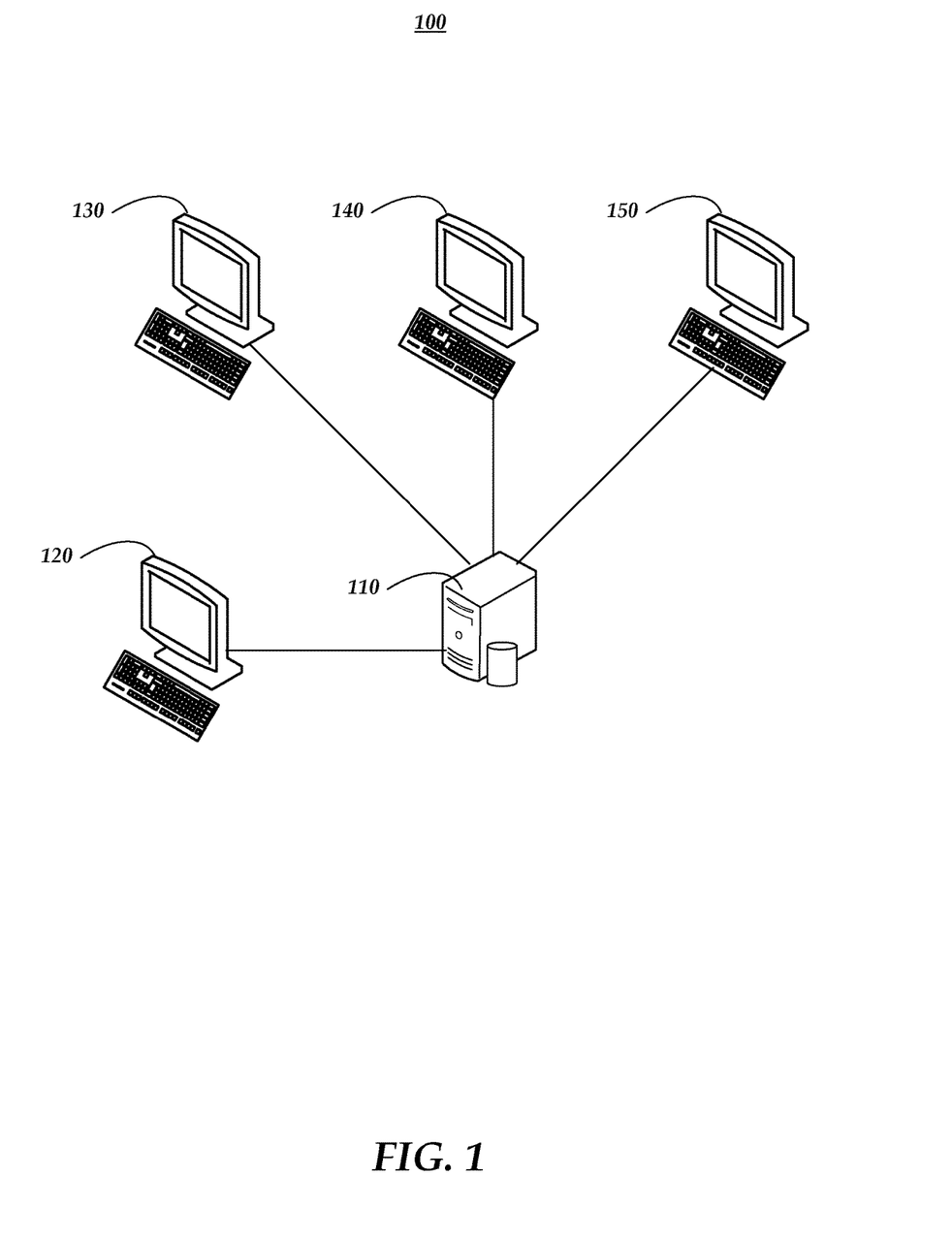
FIG. 1 is a block diagram of an operating environment.

FIG. 1 is a block diagram of an operating environment 100 comprising a server 110, an organizer computer 120, and a plurality of attendee computers 130, 140, and 150. A user of organizer computer 120 may prepare a meeting request that may be relayed to users of the plurality of attendee computers 130, 140, and 150. The meeting request may comprise a plurality of properties, such as those described in greater detail below with respect to FIG. 4. Each attendee user may accept or reject the meeting request and/or propose changes to at least one of the meeting properties, such as proposing a different time or location. The organizer user may view each attendee's response in a calendar application on organizer computer 120 and review, accept, and/or reject any proposed changes by the attendees in the calendar application. Details regarding the event may be stored on server 110 and/or replicated to organizer computer 120 and/or any and/or all of plurality of attendee computers 130, 140, and 150.

Figure 2:
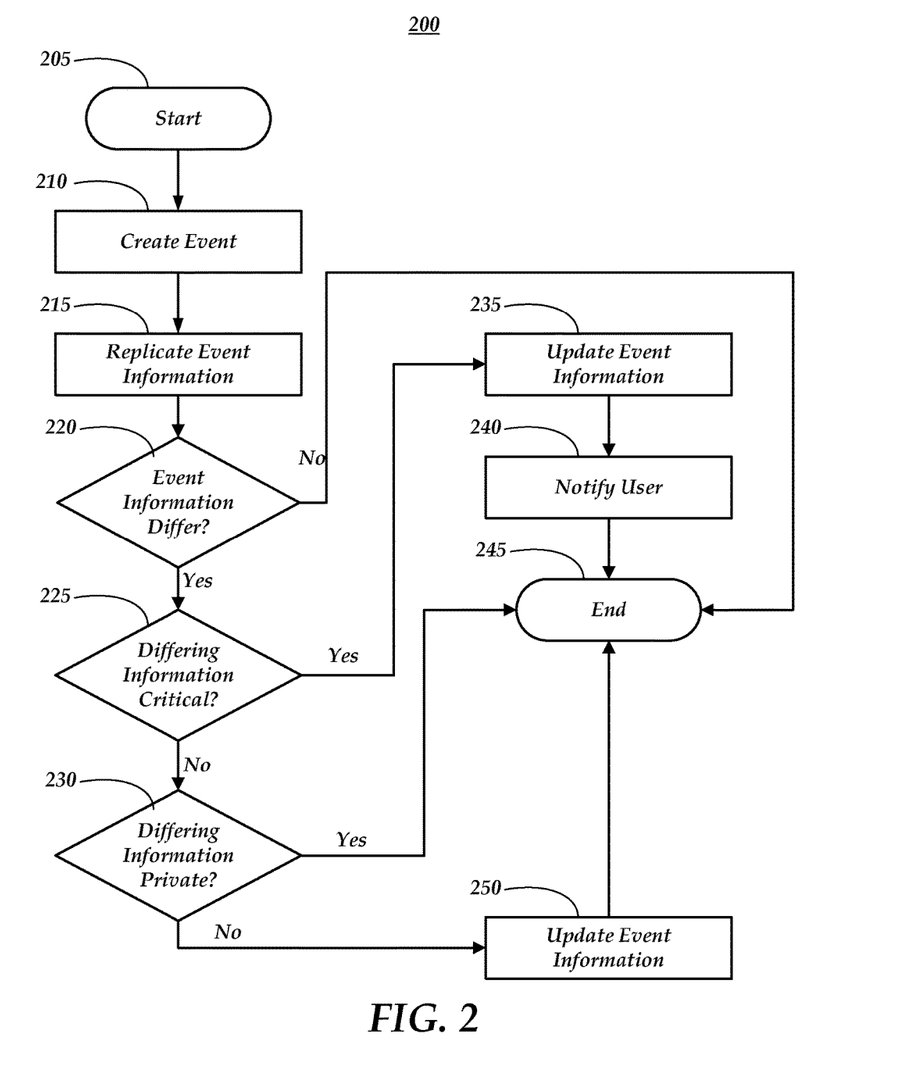
FIG. 2 is a flow chart of a method for providing calendar repair.

FIG. 2 is a flow chart setting forth the general stages involved in a method 200 consistent with an embodiment of the invention for providing calendar repair. Method 200 may be implemented using a computing device 500 as described in more detail below with respect to FIG. 5. Ways to implement the stages of method 200 will be described in greater detail below. Method 200 may begin at starting block 205 and proceed to stage 210 where computing device 500 may create an event. For example, a user of organizer computer 120 may create a meeting event and set event properties such as a start time, duration, location, and subject. The user may also send meeting invitations to a plurality of attendee users and receive responses from those attendees.

After creating the event in stage 210, method 200 may advance to stage 215 where computing device 500 may replicate the event properties to other calendars. For example, the event associated with the user of organizer computer 120 may be copied to a shared calendar on server 110 and/or a calendar application executing on at least one of plurality of attendee computers 130, 140, and 150.

From stage 215, method 200 may advance to stage 220 where computing device 500 may determine whether a property associated with a first copy of the event differs from a corresponding property associated with a second copy of the event. For example, the organizer's copy of the event may be compared to one and/or more of the attendees' copies of the event to determine whether any of the properties differ. Consistent with embodiments of the invention, this comparison may be performed on a periodic basis, such as once every 24 hours and/or during a low server load time. For example, server 110 (and/or an administrator thereof) may select a time when few other server processes are executing to perform event comparisons. The comparison may also be performed manually, such as by an administrator executing an application associated with performing method 200 on server 110.

If no differences are found at stage 220, method 200 may end at stage 245. Otherwise, method 200 may advance to stage 225 where computing device 500 may determine whether the differing information is critical. Critical information may comprise, for example, those event properties that may cause the user associated with the out-of-sync information to miss some and/or all of the meeting and/or to attempt to attend a meeting that has been canceled or rescheduled. For example, server 110 may compare the organizer's copy of the event to an event associated with a user of attendee computer 130 and determine that the organizer's copy has a start time of 9:00 while the attendee's copy has a start time of 9:30. Since the attendee would not have the correct start time, they may miss the meeting, and this difference may be considered critical.

Other critical properties may comprise, for example, an event's existence, an event's location, an event request acceptance, a duplicate property, a duplicate event, and a corruption. For example, the event may be missing entirely from the attendee's calendar and/or may have been corrupted and become unreadable by attendee computer 130, 140, or 150. Similarly, duplicate properties and/or an out-of-sync acceptance of the meeting request (e.g., the attendee accepted the meeting request, but that acceptance may not have been relayed to the organizer) may cause a calendar application and/or other applications, such as a server-based reminder service, that interact with the attendee user's calendar to miss and/or mistime a reminder.

If, at stage 225, computing device 500 determines that the differing event property is critical, method 200 may advance to stage 235 where computing device 500 may update the event property. For example, server 110 may copy the starting time from the organizer's copy of the event to the attendee's copy of the event. The organizer's copy of the event may be considered to be the master copy of the event properties, and may override the properties of the attendees' events. For another example, server 110 may determine that an event is still present on an attendee's calendar, but has been removed from an organizer's calendar. Server 110 may delete the item from the attendee's calendar, and place a copy of the event in a deleted items log and/or folder for review and/or recovery by the attendee.

Consistent with embodiments of the invention, other methods may be used to resolve differences, such as keeping a master copy of the event on the server, separate from the calendars of the attendees and/or organizer, or using a most recently updated event property as the correct value. Computing device 500 may also compare the copies of the event for the organizer and all of the attendees to determine whether a majority or plurality of the events agree on the out-of-sync property, and use the agreed on value to update the out-of-sync property.

After computing device 500 updates the event information in stage 235, method 200 may proceed to stage 240 where computing device 500 may notify the user of the update. For example, server 110, organizer computer 120, and/or attendee computers 130, 140, and 150 may display a visual notification on a screen, provide an audio alert, and/or send an e-mail or Short Message Service (SMS) message. Once computing device 500 notifies the user in stage 235, method 200 may then end at stage 245.

If, at stage 225, computing device 500 determines that the differing information is not critical, method 200 may advance to stage 230 where computing device 500 may determine whether the differing information is private. For example, the organizer and/or an attendee may add additional information to their copy of the event, such as a note to remind them to raise a particular issue during a meeting. These notes may differ and/or be absent among some or all of the other event copies, and method 200 may advance to stage 250 where computing device may copy the updated information to the other event copies. After updating the event property, or if the property is marked as private, such as by using a designated private property field and/or setting a private flag for the property, method 200 may end at stage 245.

Figure 3A:
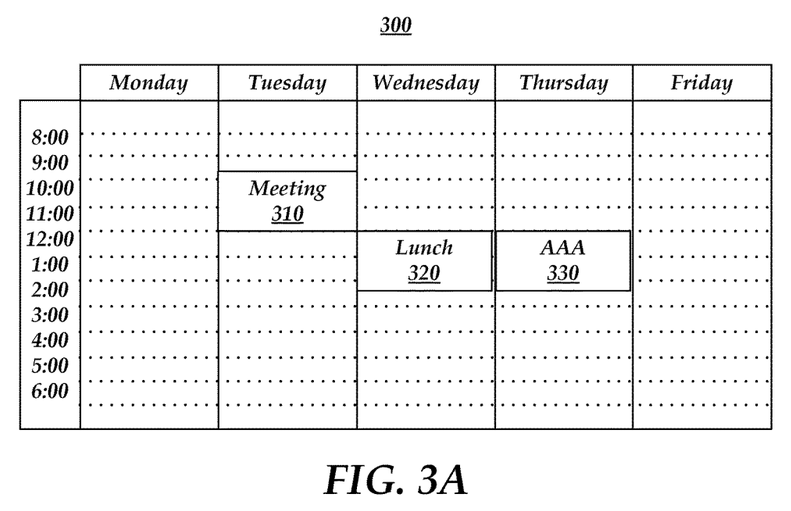
FIGS. 3A-3B are block diagrams of user calendars.

FIG. 3A comprises a block diagram of a first calendar 300 comprising a first meeting 310, a lunch event 320, and a second meeting 330. Meeting 310 and lunch meeting 320 may comprise events for which a user associated with first calendar 300 is an organizer, while second meeting 330 may comprise an event for which the user associated with first calendar 300 is an attendee.

Figure 3B:
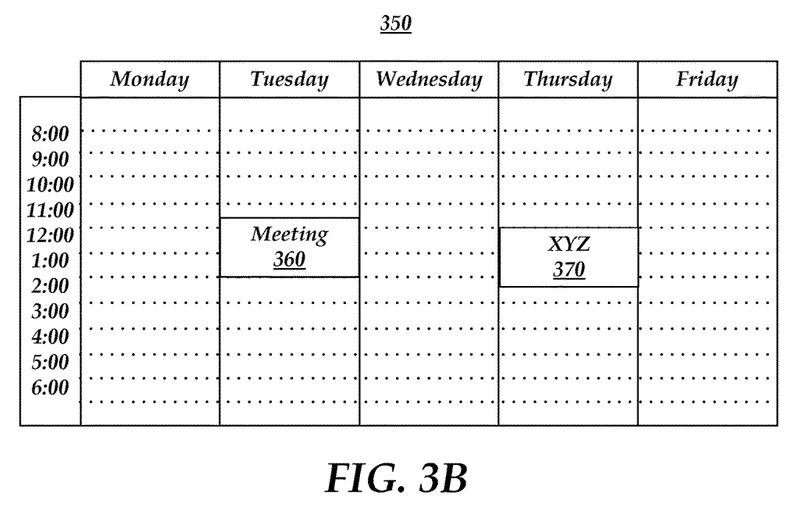

FIG. 3B comprises a block diagram of a second calendar 350 comprising a copy of the first meeting 360 and a copy of the second meeting 370. Copy of first meeting 360 may comprise an event for which a user associated with second calendar 350 is an attendee, while copy of the second meeting 370 may comprise an event for which the user associated with second calendar 350 is an organizer.

Consistent with embodiments of the invention, method 200 may be invoked by server 110 to compare the events of first calendar 300 with the events of second calendar 350. For example, first meeting 310 may comprise a start time property of 9:30 AM while copy of the first meeting 360 may comprise a corresponding start time property of 11:30 AM. Since first meeting 310 is associated with the organizer of the event, and the start time property may be considered to be critical to attendance, the start time of 9:30 AM may be used to update copy of the first meeting 360 on second calendar 350. For a second example, method 200 may determine that the user of second calendar 350 accepted a meeting request for lunch meeting 320 and may further determine that the event is missing from second calendar 250. Server 110 may therefore create an event on second calendar 350 corresponding to lunch meeting 320. For another example, server 110 may compare copy of the second meeting 370 with second meeting 330 and determine that the only difference is in the meeting title. This difference may be determined to not be critical, and so the corresponding title properties may be left out-of-sync between the two events. Consistent with embodiments of the invention, the occurrence of the comparison and determination may be recorded in a log associated with the event. Server 110 may refer to the log on a later comparison of the two events, and may consequently skip over the non-critical information rather than re-compare the properties known to be out-of-sync. An administrator of server 110 may configure a list of event properties considered to be critical, and may update this list at any time. If the list has changed, server 110 may be operative to determine whether any previously determined out-of-sync properties are now considered to be critical, and may update those properties in accordance with method 200.

Figure 4:
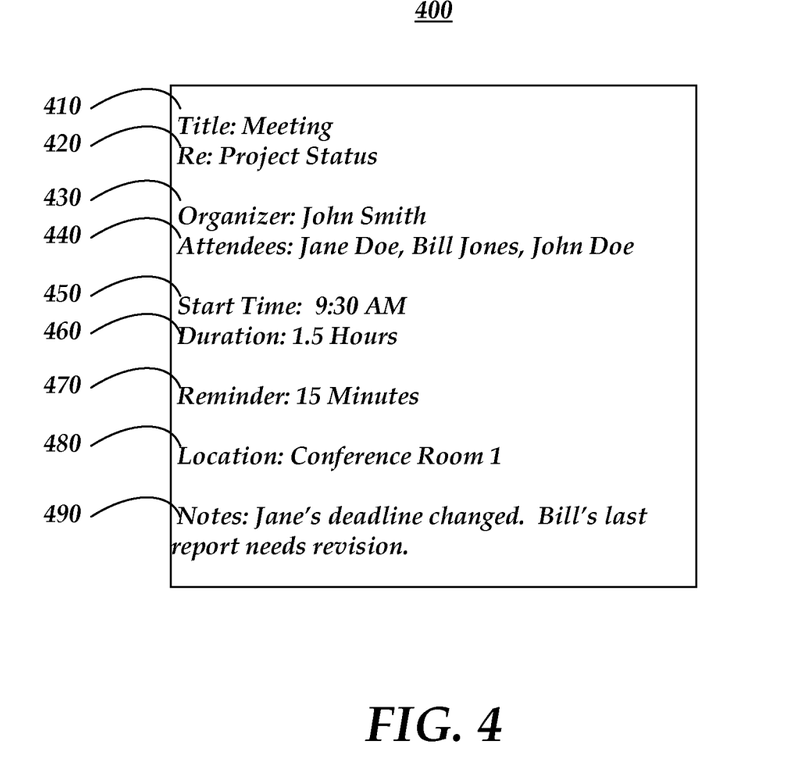
FIG. 4 is a block diagram of an example event.

FIG. 4 is a block diagram of an example event 400 comprising a plurality of properties. Example event 400 may comprise a title 410, a subject 420, an organizer 430, an attendee list 440, a start time 450, a duration 460, a reminder alarm 470, a location 480, and a notes field 490. Start time 450, duration 460, and location 480, for example, may be considered critical properties to ensure an attendee does not miss the relevant event. Notes field 490, for example, may be designated as a private property by default.

Method 200 may produce an output file comprising information indicating what updates, if any, may have been made along with identifying information for the event being updated. An output file may be produced for each user and/or each event, such as a file per user, per event, per periodic update. Consistent with embodiments of the invention, a single output file may be used for all logged updates. Each logged update may comprise a plurality of properties, such as a category, an organizer, an attendee (and/or attendees), an indication if the item was repaired due to an issue with the organizer's item or the attendee's item, a start and end time of the meeting, a subject of the meeting, a meeting type (single event, occurrence master, or occurrence instance), and/or a repair action.

If an event includes a group and/or a distribution list (e.g., a single attendee entry associated with a plurality of users), server 110 may be operative to expand the distribution list and compare the organizer's event to a copy of the event on each of the plurality of users' calendars. Consistent with embodiments of the invention, expansion of the group may be limited to a maximum number of users to avoid negatively impacting server performance. This group expansion may be configured by an administrator of server 110.

An embodiment consistent with the invention may comprise a system for providing calendar repair. The system may comprise a memory storage and a processing unit coupled to the memory storage. The processing unit may be operative to create an event associated with a plurality of attendees, copy the event to a plurality of calendars, compare a first copy of the event to a second copy of the event, and update an event property of the second event to match a corresponding event property of the first event. The comparison may be performed on a periodic basis, such as every 24 hours, and/or may occur during a time of low server load.

Another embodiment consistent with the invention may comprise a system for providing calendar repair. The system may comprise a memory storage and a processing unit coupled to the memory storage. The processing unit may be operative to create an event associated with at least one organizer and a plurality of attendees, copy at least one property associated with the event to a plurality of calendars, and determine whether the at least one property associated with the event on at least one of the plurality of calendars is the same as a corresponding property associated with the event associated with the organizer. If the properties are out-of-sync, the processing device may be further operative to update the at least one property to match the corresponding property associated with the organizer's event.

Yet another embodiment consistent with the invention may comprise a system for providing calendar repair. The system may comprise a memory storage and a processing unit coupled to the memory storage. The processing unit may be operative to create an event on a calendar associated with an organizer of the event, replicate information associated with the event to a plurality of attendee calendars, determine, on a periodic basis, whether the information associated with the event on at least one of the attendees' calendars differs from the information associated the organizer's event, determine whether any such difference comprises a property likely to cause the attendee to miss the meeting. The processing unit may be further operative to update the event on the attendee's calendar with the information from the organizer's event and provide a notification to the attendee that the event has been updated. Such notification may comprise, for example, at least one of the following: sending an e-mail message to the user, sending an SMS message to the user, and displaying a notification message on a display device associated with the user. The processing unit may be further operative to determine whether the differing information associated either the attendee's event or the organizer's event comprises a private property, and, if so, leave the information out-of-sync between the attendee event and the organizer's event.

Figure 5:
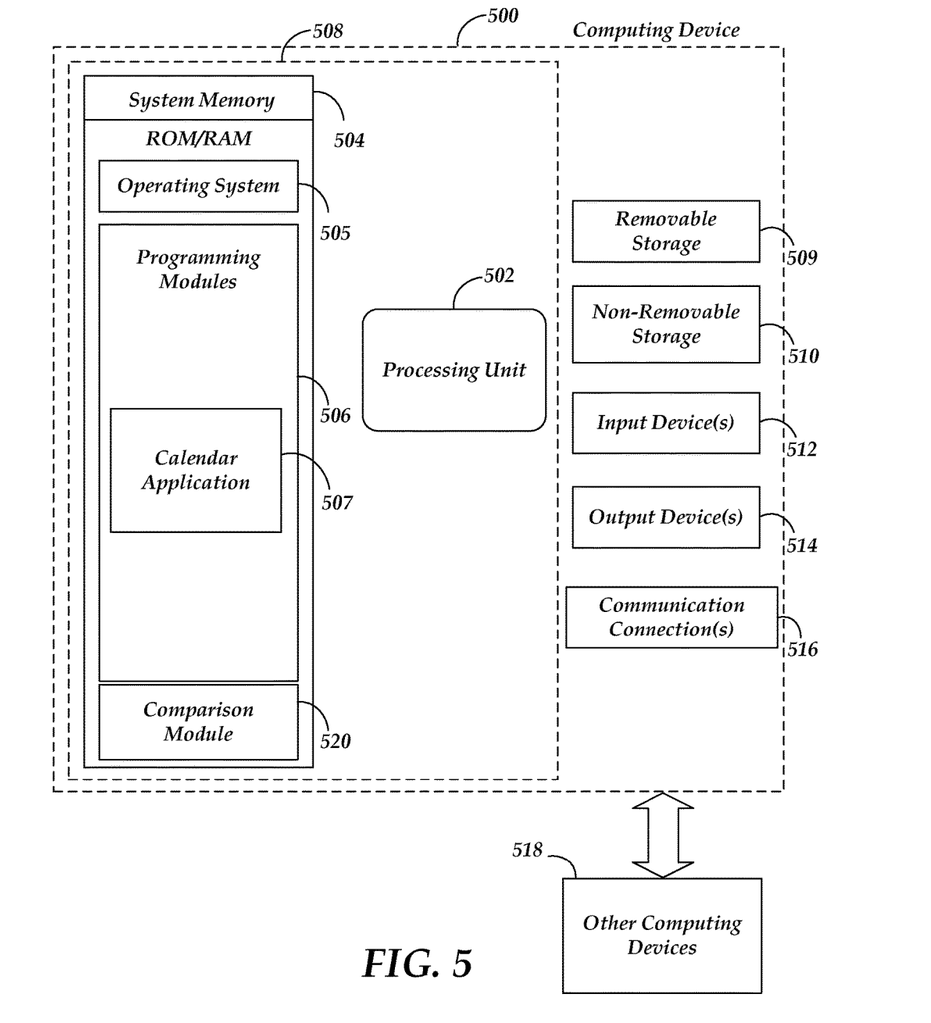
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a calendar application 507. Operating system 505, for example, may be suitable for controlling computing device 500's operation. In one embodiment, programming modules 506 may include an event comparison module 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. event comparison module 520) may perform processes including, for example, one or more of method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing electronic calendar repair, the method comprising:
   receiving a calendar event from an organizer computer that is associated with an organizer, the calendar event including a plurality of event properties comprising details about the calendar event;
   storing the calendar event on a first calendar associated with the organizer;
   copying the calendar event to a second calendar associated with an attendee;
   after a period of time, performing a comparison of the calendar event on the first calendar with the calendar event on the second calendar to identify one or more different event properties;
   determining that a first different event property is critical and a second different event property is non-critical, wherein the first different event property is one of: a start time, a date, a location and a corrupted event property;
   updating the first different event property in the second calendar with a corresponding event property from the first calendar; and
   allowing the second different event property in the second calendar to remain out-of-sync from the first calendar.

2. The method of claim 1, further comprising storing a master copy of the calendar event on a server separate from the first calendar and the second calendar.

3. The method of claim 2, wherein updating the first different event property in the second calendar includes updating the first different event property in the second calendar using the master copy of the calendar event on the server.

4. The method of claim 1, wherein the calendar event includes additional information that one of the organizer or a particular attendee designated as private, and wherein the additional information is only viewable by the organizer or the particular attendee that designated the additional information as private.

5. The method of claim 4, wherein performing the comparison of the calendar event on the first calendar with the calendar event on the second calendar to identify one or more different event properties excludes the additional information that the organizer or the particular attendee designates as private.

6. The method of claim 1, wherein the first different event property includes the calendar event being absent from the second calendar for the attendee.

7. A system for providing electronic calendar repair, the system comprising:
   a memory storage; and
   a processing unit coupled to the memory storage, wherein the processing unit is operative to:
   receive a calendar event, from an organizer computer, that is associated with an organizer, the calendar event including a plurality of event properties comprising details about the calendar event;
   store the calendar event on a first calendar associated with the organizer;
   copy the calendar event to a second calendar associated with an attendee;
   after a period of time, perform a comparison of the calendar event on the first calendar with the calendar event on the second calendar to identify one or more different event properties;
   determining that a first different event property is critical and a second different event property is non-critical, wherein the first different event property is one of: a start time, a date, a location and a corrupted event property; and
   updating the first different event property in the second calendar with a corresponding event property from the first calendar.

8. The system of claim 7, further comprising the processing unit operative to:
   store a master copy of the calendar event on a server separate from the first calendar and the second calendar; and
   wherein updating the first different event property in the second calendar includes updating the first different event property in the second calendar using the master copy of the calendar event on the server.

9. The system of claim 7, wherein the calendar event includes additional information that one of the organizer or a particular attendee designated as private, the additional information being only viewable by the organizer or the particular attendee that designated the additional information as private.

10. The system of claim 9, wherein performing the comparison of the calendar event on the first calendar with the calendar event on the second calendar to identify one or more different event properties excludes the additional information that the organizer or the particular attendee designates as private.

11. The system of claim 7, wherein the first different event property includes the calendar event being absent from the second calendar for the attendee.

12. The system of claim 7, further comprising the processing unit operative to:
allow the second different event property in the second calendar to remain out-of-sync from the first calendar.

13. A computer-readable storage device which stores a set of instructions which when executed performs a method for providing electronic calendar repair, the method executed by the set of instructions comprising:
receiving a calendar event, from an organizer computer, associated with an organizer, the calendar event including a plurality of event properties comprising details about the calendar event;
storing the calendar event on a first calendar associated with the organizer;
copying the calendar event to a second calendar associated with an attendee;
after a period of time, performing a comparison of the calendar event on the first calendar with the calendar event on the second calendar to identify one or more different event properties;
determining that a first different event property is critical and a second different event property is non-critical, wherein the first different event property is one of: a start time, a date, a location and a corrupted event property; and
updating the first different event property in the second calendar with a corresponding event property from the first calendar.

14. The computer-readable storage device of claim 13, wherein the calendar event includes additional information that one of the organizer or a particular attendee designated as private, the additional information being only viewable by the organizer or the particular attendee that designated the additional information as private.

15. The computer-readable storage device of claim 14, wherein performing the comparison of the calendar event on the first calendar with the calendar event on the second calendar to identify one or more different event properties excludes any additional information that the organizer or the particular attendee designates as private.

16. The computer-readable storage device of claim 13, the method executed by the set of instructions further comprising:
storing a master copy of the calendar event on a server separate from the first calendar and the second calendar.

17. The computer-readable storage device of claim 16, wherein updating the first different event property in the second calendar includes updating the first different event property in the second calendar using the master copy of the calendar event on the server.

18. The computer-readable storage device of claim 13, wherein the first different event property includes the calendar event being absent from the second calendar for the attendee.

19. The computer-readable storage device of claim 13, the method executed by the set of instructions further comprising:
allowing the second different event property in the second calendar to remain out-of-sync from the first calendar.

* * * * *